United States Patent
Lee et al.

(10) Patent No.: US 12,470,380 B2
(45) Date of Patent: Nov. 11, 2025

(54) TERTIARY-LEVEL ENCRYPTION KEY SCHEME

(71) Applicant: Dropbox, Inc., San Francisco, CA (US)

(72) Inventors: Jonathan Lee, Seattle, WA (US); Rajat Goel, San Jose, CA (US); Stas Ilinskiy, Seattle, WA (US); Wesley Rodriguez, San Francisco, CA (US); April King, Saint Paul, MN (US); Joseph Eichenhofer, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 491 days.

(21) Appl. No.: 17/957,515

(22) Filed: Sep. 30, 2022

(65) Prior Publication Data

US 2023/0336343 A1    Oct. 19, 2023

Related U.S. Application Data

(60) Provisional application No. 63/363,093, filed on Apr. 15, 2022.

(51) Int. Cl.
*H04L 9/14* (2006.01)
*H04L 9/08* (2006.01)

(52) U.S. Cl.
CPC ............ *H04L 9/14* (2013.01); *H04L 9/0877* (2013.01)

(58) Field of Classification Search
CPC ...... H04L 9/14; H04L 9/0877; G06F 21/6209
See application file for complete search history.

(56) References Cited

U.S. PATENT DOCUMENTS

| | | | |
|---|---|---|---|
| 9,426,517 B2* | 8/2016 | Kozat | G06F 11/1096 |
| 9,544,140 B1* | 1/2017 | Bhatia | H04L 9/34 |
| 10,778,429 B1* | 9/2020 | Rubin | H04L 9/0897 |
| 2003/0046260 A1 | 3/2003 | Satyanarayanan et al. | |
| 2009/0019548 A1 | 1/2009 | Reid | |
| 2009/0323937 A1* | 12/2009 | Teng | H04L 9/0891 |
| | | | 380/36 |
| 2014/0046906 A1 | 2/2014 | Patiejunas et al. | |
| 2019/0146931 A1 | 5/2019 | Frolikov | |
| 2019/0278509 A1 | 9/2019 | Suryanarayana et al. | |
| 2021/0091951 A1 | 3/2021 | Wilson et al. | |
| 2021/0136047 A1 | 5/2021 | Wilson | |
| 2021/0165571 A1 | 6/2021 | Kanno | |
| 2022/0200968 A1* | 6/2022 | Helmick | H04L 9/0825 |

* cited by examiner

Primary Examiner — Moeen Khan
(74) Attorney, Agent, or Firm — Polsinelli PC

(57) ABSTRACT

A system, method, and computer readable medium is disclosed for accessing an object that is encrypted within at least a tertiary-level encryption key scheme. This includes receiving a request to access blocks making up an object by content management system and using a top-level encryption key from a key management service, a namespace encryption key from a namespace encryption key database, and a respective block encryption keys protecting the blocks making up the object. Using these keys, the system can decrypt the block encryption keys using the namespace encryption key and decrypt the blocks using the block encryption keys, thereby providing access to the object.

14 Claims, 11 Drawing Sheets

TERTIARY-LEVEL ENCRYPTION KEY SCHEME

CROSS-REFERENCE TO RELATED APPLICATIONS

This application claims priority to U.S. provisional application No. 63/363,093, filed on Apr. 15, 2022, entitled Proper Key Management, which is expressly incorporated by reference herein in its entirety.

BACKGROUND

Cloud storage systems allow users to store and access data on the cloud. Some cloud storage systems allow users to share data with other users and access the data in a collaborative fashion. In some cases, users may also store and access local copies of the data on their client devices. The local copies of the data may provide users with faster access to the data. Additionally, the local copies can allow the users to access the data when the users are offline. Cloud storage systems may also allow users to synchronize their local copies of the data with the data on the cloud to ensure consistency. For example, a cloud storage system may synchronize copies of data across a number of client devices and servers so each copy of data is identical. However, synchronization of data across multiple devices can be an extremely difficult task, often resulting in data inconsistencies, undesirable effects, and even loss of data.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
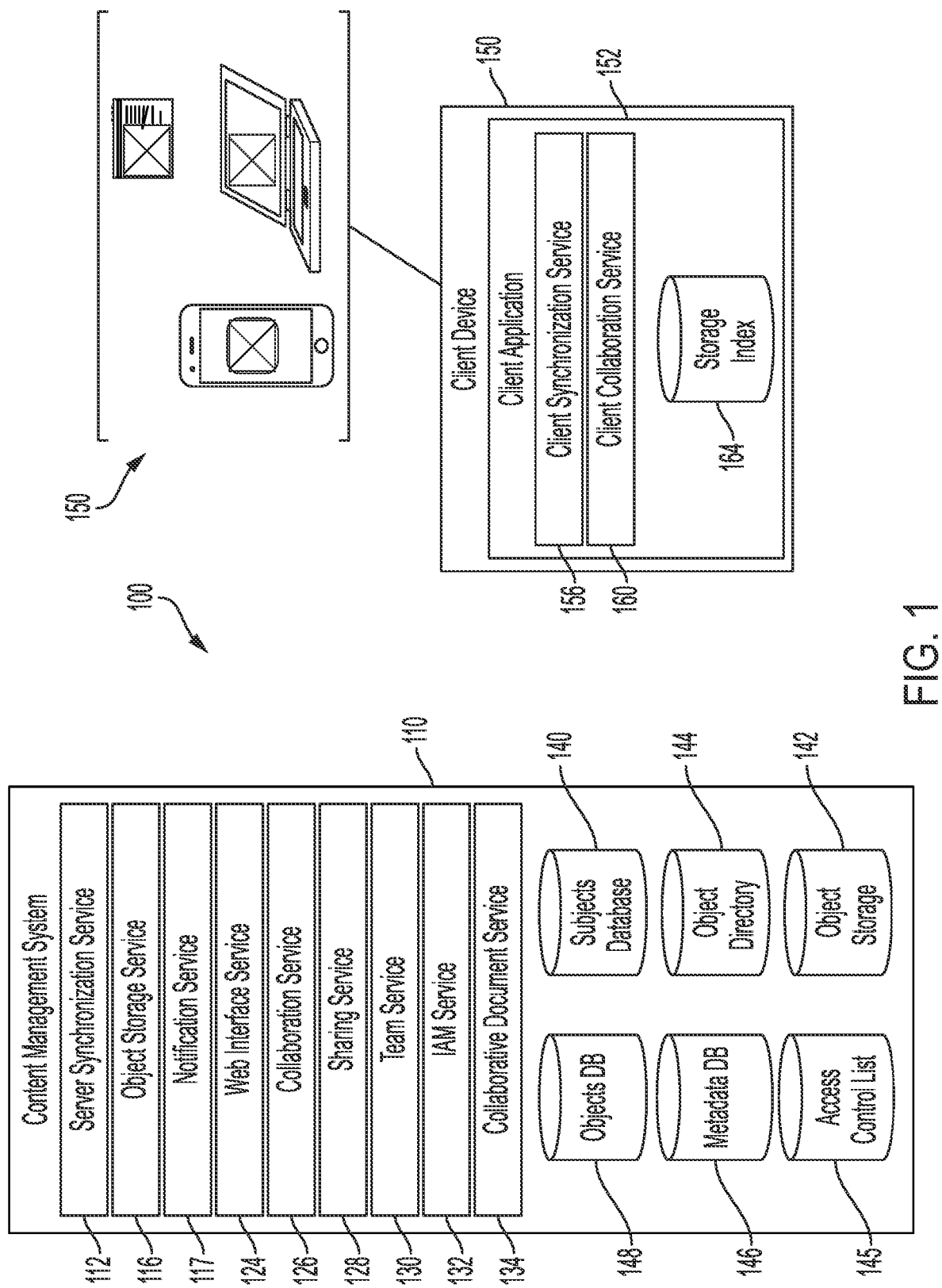
FIG. 1 illustrates an example of a content management system and client devices in accordance with some aspects of the present technology.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Cloud storage systems allow users to store and access objects across multiple devices. The objects may include, but are not limited to, files, documents, messages (e.g., email messages, text messages, comments, notifications, etc.), media files (e.g., images, videos, audio files, etc.), folders, and/or any other unit and/or type of digital content or data. Objects may be shared with multiple users who can interact with the shared objects and/or collaborate with each other through the shared objects. Moreover, users can perform one or more object operations such as, for example and without limitation, adding/storing an object, modifying an object, deleting an object, renaming an object, moving an object, sharing an object, copying an object, viewing an object, mounting an object (e.g., a share or namespace), partitioning an object, encrypting an object, etc.

However, when storing the objects, several methods can be used to protect those objects, including using encryption. For example, currently a system can use an encryption scheme based on having a key for each individual block being stored. To ensure the security of the blocks at rest, they can each be encrypted with a random unique block encryption key (BEK). The objects and block encryption keys stored can be encrypted with any standard encryption, including AES-256 with the standard common cryptographic libraries to implement encryption and random key generation.

BEKs can be generated by the storage system at block write time using standard cryptographic libraries to generate 256-bit cryptographically random symmetric keys. BEKs can be encrypted with high level encryption, e.g., NEKs discussed below, by the storage system using standard cryptographic libraries, specifically using AES-256. Due to the scale of the cardinality of blocks, these encrypted BEKs are persisted within storage alongside the encrypted data for each block with the same storage device characteristics.

When an object is uploaded to a content management system, the system can break the object down into several blocks, each on the order of single-digit megabytes in size. The content management system can then index the encryption keys for each block by the namespace to which the block belongs and the hash value of the plaintext content of the block. This allows the content management system to operate as a Content-Addressable Storage (CAS) system, with individual encrypted object blocks to be retrieved based on the hash value of the block. Prior to storing the block, the plaintext of each block is encrypted with a unique block encryption key that is randomly generated at write time by the content management system. The unique block encryption keys can be generated randomly irrespective of the block contents or namespace associations.

Encrypting at the block level allows the system to provide security and protects the underlying data from being compromised. However, if the system were to be compromised in any way, recovery to a non-compromised system is imperative and yet costly and time consuming. Each block itself would need to be decrypted to remove the compromised encryption key, and then encrypted with the new key that is not compromised.

These block encryption keys can be protected via a global security key at the point of storage. However, implementing a storage system with only a single global security key, while better protected, can still be compromised and does not address the shortcomings of block-level only encryption. If the global key becomes compromised, the block keys are still vulnerable to exploitation, and the underlying cycle of having to provide new encryption to each of the blocks remains.

A challenge related to top-level keys (TEKs) is that these keys are generally generated and stored inside a Key Management Service (KMS). Often these KMSs are third-party services that utilize FIPS-140-2 validated hardware security modules (HSMs) to protect key material. One example of a key management service that can be utilized is Amazon Web Services Key Management Service (AWS KMS). These KMSs are often expensive to access, and since the content management system has a large number of blocks, the content management system would need to access the KMSs often. Not only is the access costly, but it is undesirable to be frequently sending the top-level key over network connections to be used by the content management system.

Another challenge related to the encryption of objects pertains to when objects need to be shared or moved. One consequence of encrypting blocks making up objects where the decryption keys for the blocks are secured by top-level keys (or team-level keys) is that sharing or moving objects with people or locations outside of the team is often slow. This is because the system can't share the top-level key that is needed to decrypt the block-level decryption key without making all of the data under the top-level key vulnerable. The system must decrypt the blocks before they are shared. If a large object or a large number of objects are transferred this process can cause considerable delay.

Embodiments presented in this disclosure offer various advantages and solutions to the above shortcomings and disadvantages described above. For example, as a solution, block encryption keys, at rest can be encrypted using namespace encryption keys (NEKs). NEKs themselves are encrypted with a top-level encryption key (TEK). TEKs can be generated and stored inside the Key Management Service (KMS) as introduced above. NEKs can be generated as data keys by AWS KMS but stored outside of AWS KMS.

TEKs can be generated by AWS KMS as needed using AWS KMS's built-in KMS key generation API to generate 256-bit cryptographically random symmetric keys. TEKs are encrypted at generation time via the AWS KMS data key generation API, which internally uses AES-256 in Galois/Counter Mode (GCM) to encrypt the key. GCM is recommended by SP 800-38D. The encrypted TEKs are persisted within AWS KMS, inside a FIPS 140-2 validated HSM. AWS KMS allows authorized entities to use keys for decryption purposes as previously described while ensuring the unencrypted top level key never leaves the hardware security module layer during use.

The block encryption keys are protected by encrypting or wrapping each block encryption key with the NEK belonging to the object's namespace. The namespace is the smallest unbreakable unit of data ownership within the storage system, this includes the namespace having full access permissions to the objects within the namespace. By using the smallest unbreakable unit of data ownership, the intermediate key within the tertiary-level encryption key scheme provides for a level of encryption based on ownership of the objects within the namespaces, including access permissions provided to the user account associated with the namespace. When ownership is used as the basis of the intermediate key within the tertiary-level encryption key scheme, a user can transfer ownership, e.g., copy or share, of the object via sharing the intermediate key. The intermediate key also allows for easier solutions to compromised keys, because then only the compromised key needs to be changed to regain security within the system, rather than having to change the encryption at the block level. The namespace encryption keys are further protected by a higher layer of encryption, e.g., the TEK discussed herein.

NEKs can be generated by AWS KMS at namespace creation time and exported using the AWS KMS data key generation API, to generate 256-bit cryptographically random symmetric keys. NEKs are encrypted with corresponding TEKs, discussed below, at generation time via the AWS KMS data key generation API, which internally uses AES-256 in Galois/Counter Mode (GCM) to encrypt the key. GCM is recommended by SP 800-38D. The encrypted NEKs are persisted within storage alongside additional metadata about namespaces in a database with on-disk encryption enabled. One method of decryption is performed by sending the encrypted NEK to AWS KMS through the AWS KMS decryption API. The plaintext NEK is used to encrypt BEKs at rest as discussed herein.

The intermediate level of encryption provided by the namespace encryption key provides advantages to the content management system, including the ability to save objects in a high performing and efficient manner. This intermediate layer also helps provide additional encryption key isolation at the specific level at which objects are copied or reparented. Accordingly, using top level encryption keys that are team based along with the namespace encryption keys for encrypting the block encryption keys, creates a tertiary-level encryption key scheme that solves the above problems.

More specifically, the namespace encryption key reduces the number of calls to the KMS. Calls to the KMS are only required when the content management system needs to request a new namespace encryption key or needs the TEK to decrypt a stored namespace encryption key. The namespace encryption key can be temporarily stored by the content management system in a decrypted state so that it is available to decrypt the block keys. Thus, each read or write operation from the content management system can call a namespace encryption key storage service within the content management system instead of calling the KMS.

The namespace encryption key also improves the speed of object sharing and has a reduced need for processing resources for object sharing. One consequence of encrypting blocks making up objects where the decryption keys are specific to a team is that sharing or moving objects with people or locations outside of the team is often slow. This is because the system can't share the top-level key that is needed to decrypt the block-level decryption key without making all of the data under the top-level key vulnerable. The system must decrypt the blocks before they are shared. If a large object or a large number of objects are transferred this process can cause considerable delay.

The present technology avoids both of the above problems by introducing the middle-level key—the namespace encryption key. In the tertiary-level encryption key scheme addressed herein, the system can share the namespace encryption key with a user(s) receiving the objects. While some objects that are not being shared might also be encrypted by the namespace encryption key, this is often a small number of objects compared to the number of objects protected by the top-level (team key).

The sharing or moving of an object that includes sharing the namespace encryption key results in substantially instantaneous sharing of the object. By substantially instantaneous it is meant that the users do not perceive any delay. A sharing user shares the object and the receiving user can access the object as soon as they receive the notification, which is nearly immediate. On a more technical level, substantially instantaneous means that the objects are shared without first being decrypted. The receiving user receives access to the encrypted blocks and also receives the namespace encryption key needed to decrypt the block keys at the time the receiving user desires to access the object. There is no delay due to any encryption/decryption operations and the blocks do not need to be copied from on location to another in the content management system. Rather the content management system records updated access permissions to the shared objects and notifies the recipients that they can access the shared objects.

A content management system in line with the current disclosure, can have embodiments deployed in the context having object synchronization capabilities and collaboration features, among others. An example system configuration of system 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subjects database 140. Subjects database 140 can identify a registered subject by a subject ID, and store profile information for registered subjects in association with the subject ID. In some cases, profile information for registered subjects includes a subject name and/or email address. Subjects database 140 can include account management information, such as account type (e.g., various tiers of free or paid accounts), storage space allocated, storage space used, client devices 150 having a registered content management system client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subjects database 140 need not store complete information associated with an account for a subject. Some portion of information associated with an account for a subject can also be stored in another database of content management system 110 such as metadata database 146, or in a database external to content management system 110.

Subjects database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subjects database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example, a mobile device might have a local file system accessible by multiple applications resident thereon, or might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments, client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use client storage index 164 to facilitate the synchronization of at least a portion of the objects within client storage with objects associated with a subject account on content management system 110. For example, client synchronization service 156 can compare client storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subjects database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, client storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can add associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments, content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 130 can provide a common shared space for the team, private subject account folders, and access limited shared folders. Team service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g., a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notification service 117 when client device 150 is accessing the object. Notification service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by client application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively, or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone client application 152, one or more application plug-ins, and/or a browser extension. However, the subject can also interact with content management system 110 via a third-party application, such as a web browser, that resides on client device 150 and is configured to communicate with content management system 110. In various implementations, the client application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments, content management system 110 can include functionality to interface with one or more third party services such as workspace services, email services, task services, etc. In such embodiments, content management system 110 can be provided with login credentials for a subject account at the third-party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
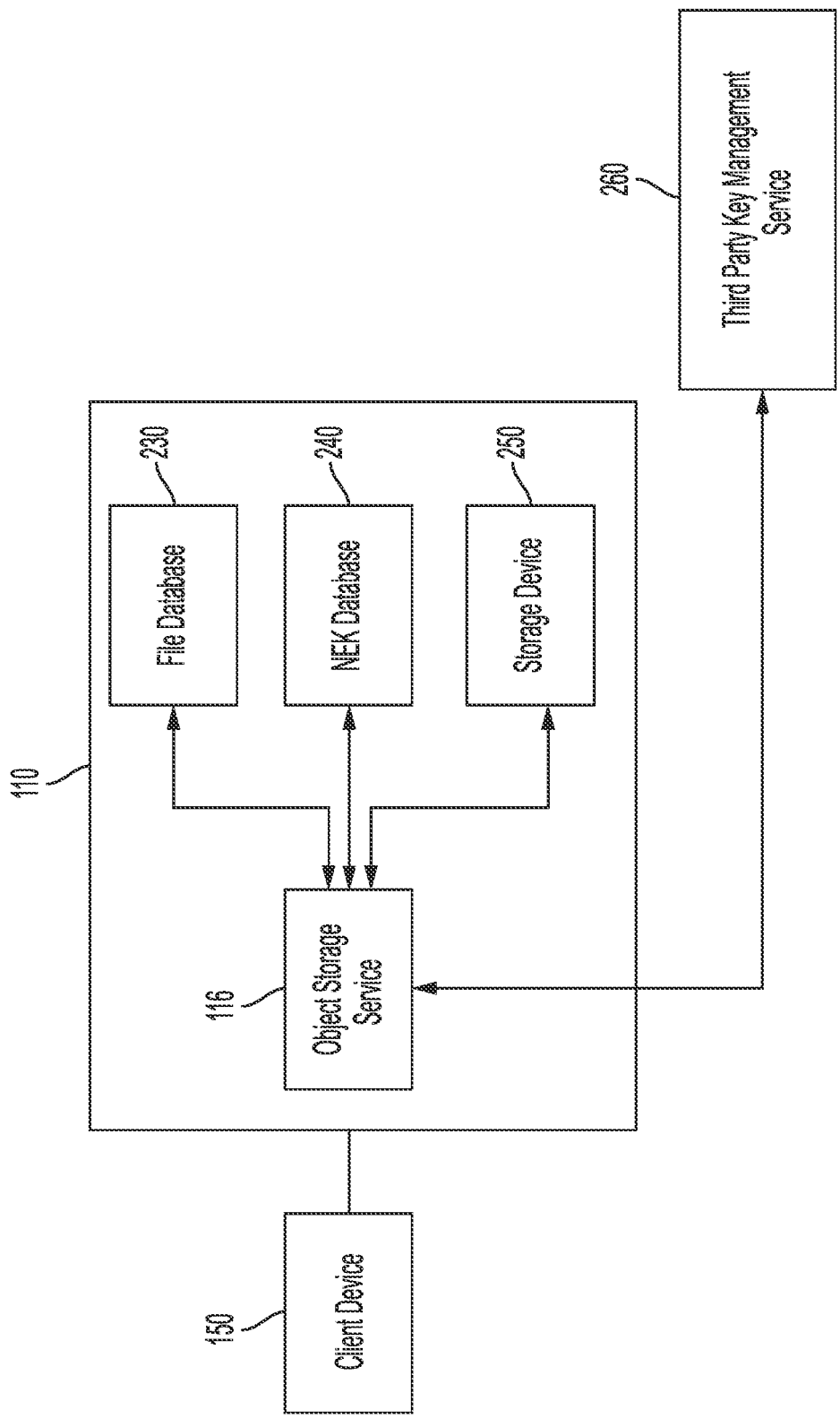
FIG. 2 illustrates an example system configuration for creating and storing a tertiary-level encryption key management scheme in accordance with some aspects of the present technology.

FIG. 2 illustrates an example system implementing a tertiary-level encryption key scheme in accordance with some aspects of the present disclosure. In one example of using the system of FIG. 2, a client device 150, using an application associated with the content management system, requests an object from the content management system 110. Initially, the content management system will confirm that the user account requesting the object has appropriate permissions to access the object. When the user account has the appropriate permissions, the object storage service 116 will query the objects database 148 to retrieve the folder associated with the requested object as well as each of the blocks that makes up the object. This query can include the credentials provided by the user account that confirm to the system that the user account has permission to access the requested object.

The objects database 148 uses the credentials provided to the object storage service 116 to verify that the user account has at least read access to the objects database 148. Once the credentials are confirmed, the object database will use the retrieved folder information to query the namespace encryption key database 240 to retrieve the associated encrypted namespace encryption key. The namespace encryption key database 240 will also verify the credentials provided to the content management system have at least read access permission for the namespace encryption key database 240. Based on the confirmation of the credentials, the namespace encryption key database 240 will provide the encrypted namespace encryption key to the object storage service 116.

When the object storage service 116 has the encrypted namespace encryption key, the object storage service 116 can send the provided credentials and the encrypted namespace encryption key to a third-party key management service 260 to decrypt the encrypted namespace encryption key. The third-party key management service 260 will confirm that the credentials provided by the object storage service 116 has permissions associated with the namespace encryption key, and then decrypts the encrypted namespace encryption key. After decrypting the namespace encryption key, the now plaintext namespace encryption key will be sent from the third-party key management service 260 to the object storage service 116.

Now with the plaintext namespace encryption key, the object storage service 116 will fetch the encrypted block encryption key and the encrypted data from the storage device 250. For each of the fetched blocks, the object storage service 116 uses the plaintext namespace encryption key to decrypt the encrypted block space encryption key. The decrypted block space encryption key is then used to decrypt the fetched encrypted data blocks. The object storage service 116 then combines the data from the now decrypted data blocks to create the complete unencrypted object that was requested by the user account at the client device 150.

Figure 3:
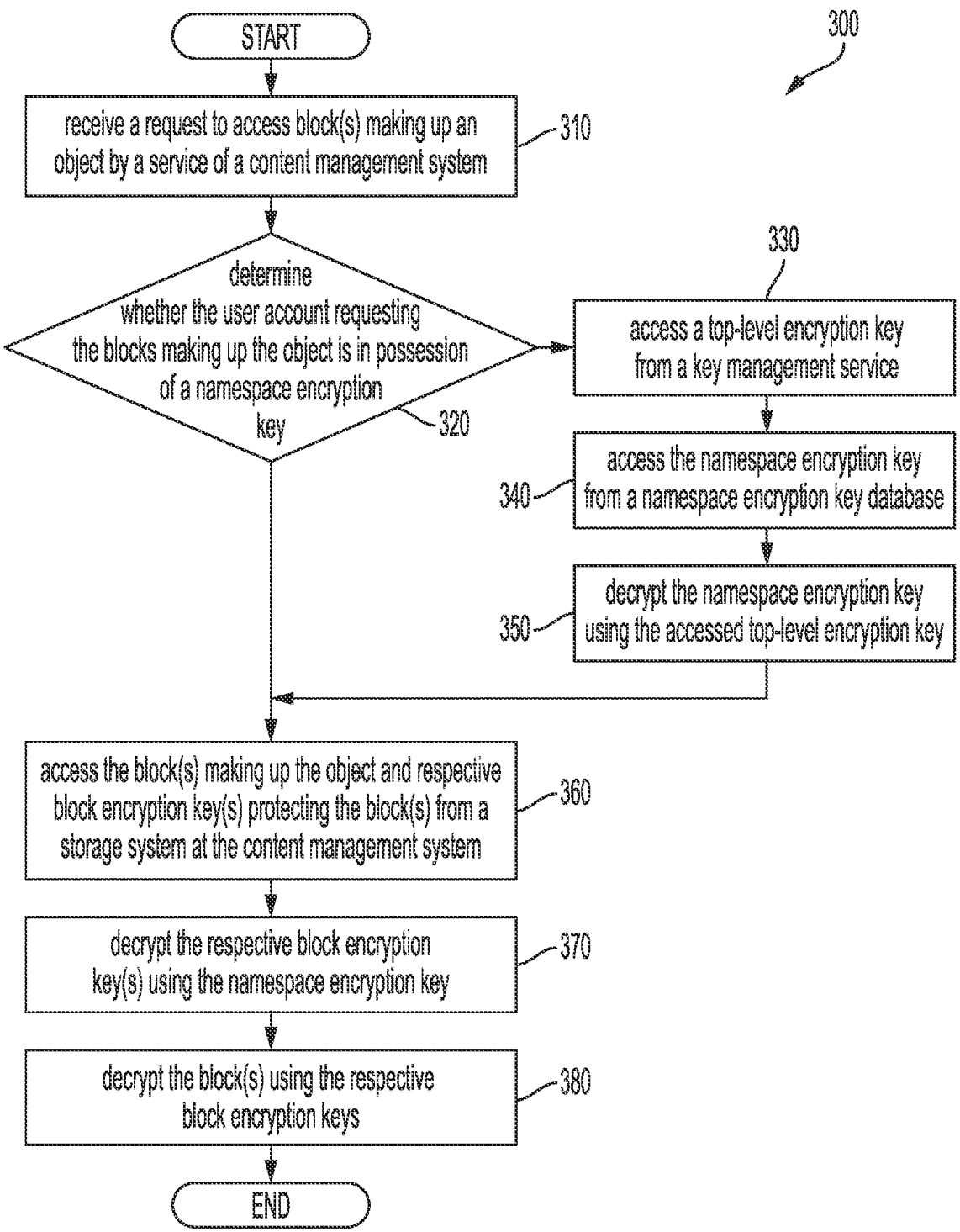
FIG. 3 is a flow chart showing an example method for accessing an object encrypted by a tertiary-level encryption key scheme in accordance with some aspects of the present disclosure.

FIG. 3 is an example method 300 for implementing a tertiary-level encryption key scheme, where the block level encryption keys are encrypted using a namespace level encryption key, which is encrypted using a top-level encryption key. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

More specifically, FIG. 3 illustrates an example of a decrypting blocks making up an object when the blocks are protected using the tertiary-level encryption key scheme described herein.

According to some examples, the method includes receiving a request to access blocks making up an object by a service of a content management system at block 310. For example, the content management system 110 illustrated in FIG. 2 may receive a request to access blocks making up an object. Objects are stored in blocks no greater than 4 MB in size. Thus, an object less than 4 MB will be stored in one block, while an object of greater than 4 MB will be stored in at least two blocks.

Each of the blocks making up the object are stored at the content management system and are encrypted using block level encryption keys. Further, the block level encryption key can be encrypted with a namespace encryption key, thereby providing further security for the object. The encrypted version of block level encryption keys (encrypted with the namespace encryption key) can be stored with the encrypted blocks. The namespace encryption key, however, is not stored with the blocks, but rather is stored at the namespace encryption key database 240.

According to some examples, the method includes determining whether the user account requesting the blocks making up the object is in possession of a namespace encryption key at block 320. For example, the object storage service 116 illustrated in FIG. 2 may determine whether the user account requesting the blocks making up the object is in possession of a namespace encryption key. The namespace encryption key can also be encrypted and stored at the namespace encryption key database 240 of the content management system.

The encrypted version of the namespace encryption key is protected by a top-level encryption key that can be stored at a third-party key management service 260 that is external to the content management system 110, though, it is possible for the top-level encryption key to be stored locally at the content management system 110. The third-party key management service 260 comes with some advantages of being compliant with the stringent industry standards for key safety and special purpose hardware modules, but it is expensive to make requests from the third-party key management service 260. A compromise is to store the top-level key at the third-party key management service 260 and store the namespace encryption key at the namespace encryption key database 240 of the content management system 110. Using this scheme, fewer look ups are required of the third-party key management service 260 because the system only needs to decrypt the namespace encryption key when it is requested.

According to some examples, when it is determined that the user account requesting the blocks is not in possession of the namespace encryption key, the method includes accessing a top-level encryption key from a key management service 260 at block 330 at a key management service database. When the namespace encryption key is encrypted with a top-level encryption key, the object storage service 116 illustrated in FIG. 2 may access a third-party key management service 260 to decrypt the namespace encryption key. The object storage service 116 accesses the third-party key management service 260 by, for example, sending the encrypted namespace encryption key to the third-party key management service 260, which has access to the top-level encryption key. The third-party key management service can then decrypt the namespace encryption key and provide the plaintext namespace encryption key to the object storage service 116. Alternatively, the object storage service 116 can access a top-level encryption key stored at the content management system 110. In this latter scenario, the object storage service 116 can decrypt the encrypted namespace encryption key using the top-level encryption key. The decrypted namespace encryption key can be stored for a limited time (e.g., throughout a session or for a time to live (TTL)) by the object storage service 116.

According to some examples, the method includes accessing the namespace encryption key from a namespace encryption key database at block 340. For example, the object storage service 116 illustrated in FIG. 2 may access the namespace encryption key from a namespace encryption key database 240. The namespace encryption key is encrypted with the top-level encryption key. The storage system, once it has the encrypted namespace encryption key, then begins the process of decrypting the encrypted namespace encryption key, which includes accessing the third-party key management service.

According to some examples, the method includes decrypting the namespace encryption key using the accessed top-level encryption key at block 350. For example, the object storage service 116 illustrated in FIG. 2 may decrypt the namespace encryption key using the accessed top-level encryption key if the top-level encryption key is stored locally at the content management system 110. However, alternatively, the object storage service 116 can send the encrypted namespace encryption key to the third-party key management service 260 and request that the third-party service decrypt the encrypted namespace encryption key and provide it to object storage service 116 as, for example, plaintext.

When the user account requesting the blocks making up the object is in possession of the namespace encryption key, according to some examples, the method includes accessing the blocks making up the object and respective block encryption keys protecting the blocks from a storage system at the content management system at block 360. For example, the object storage service 116 illustrated in FIG. 2 may access the blocks making up the object and respective block encryption keys protecting the blocks from a storage device 250 at the content management system 200. The block encryption keys are encrypted with the namespace encryption key. Furthermore, each block making up the object is encrypted with a block encryption key that is unique to each respective block.

According to some examples, the method includes decrypting the respective block encryption keys using the namespace encryption key at block 370. For example, the object storage service 116 illustrated in FIG. 2 may decrypt the respective block encryption keys using the namespace encryption key.

According to some examples, the method includes decrypting the blocks using the respective block encryption keys at block 380. For example, the object storage service 116 illustrated in FIG. 2 may decrypt the blocks using the respective block encryption keys. The content management system 200 can then combine the data from the decrypted blocks together to create the object from the blocks. The content management system is then able to send the complete object, along with the block list associated with the object, to a client device requesting the object.

Figure 4A:
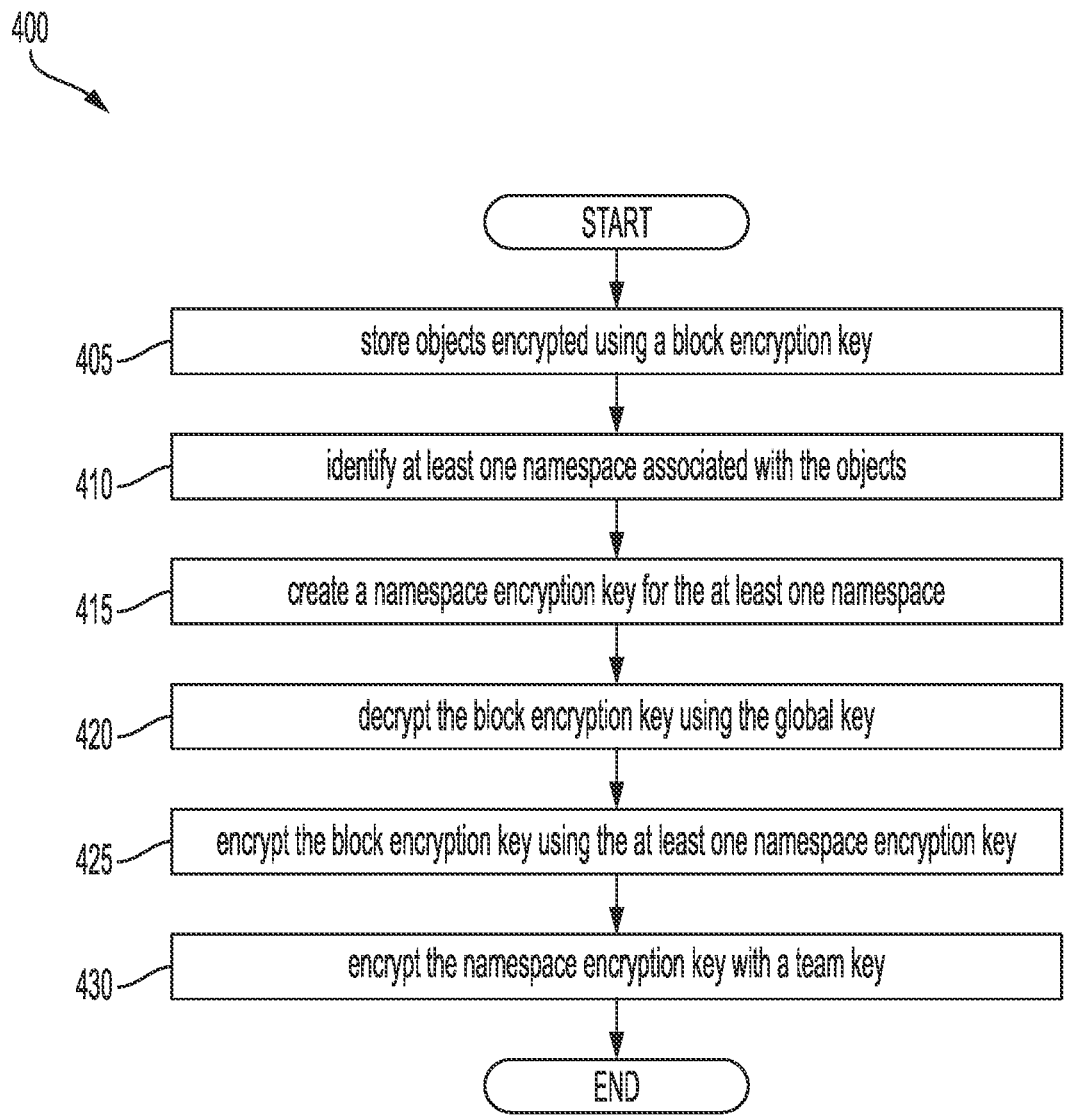
FIG. 4A is a flow chart showing an example method for a transition from a system using a global key to a tertiary-level encryption key scheme in accordance with some aspects of the present disclosure.

FIG. 4A illustrates an example method 400 for transitioning from a system using a global key to a tertiary-level encryption key scheme described herein. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes storing objects encrypted using a block encryption key at block 405. For example, the storage device 250 illustrated in FIG. 2 may store objects encrypted using a block encryption key. The block encryption key can be encrypted with a global key and to implement the currently described tertiary-level encryption key scheme, the global key system would need to be deprecated and replaced.

According to some examples, the method includes identifying at least one namespace associated with the objects at block 410. For example, the object storage service 116 illustrated in FIG. 2 may identify at least one namespace associated with the objects. This identification of the namespace includes using the credentials supplied by a user account that has access to the object. The credentials from the user account are associated with namespaces the user account has permission to access, which is determined by the content management system 110. Based on the identification of the namespaces associated with the user account, the system is able to determine if a namespace encryption key is available or if the system needs to create a new namespace encryption key. In one example of a system transitioning from the global key encryption scheme to a tertiary-level key encryption scheme the system, the namespace encryption key would need to be generated.

According to some examples, the method includes creating a namespace encryption key for at least one namespace at block 415. For example, the third-party key management service 260 illustrated in FIG. 2 can generate namespace encryption keys based on the namespace associated with the object. These generated namespace encryption keys can then be stored at the namespace encryption key database 240 as illustrated in FIG. 2. In one example, each namespace encryption key is unique for each particular namespace.

According to some examples, the method includes decrypting the block encryption key using the global key at block 420. For example, the object storage service 116 illustrated in FIG. 2 may decrypt the block encryption key using the global key. In this example, each block of the object is encrypted with a block encryption key. Under the global key scheme, each of the block encryption keys would be decrypted using the global key, to create a plaintext block encryption key.

According to some examples, the method includes encrypting the block encryption key using the at least one namespace encryption key at block 425. For example, the object storage service 116 illustrated in FIG. 2 may encrypt the block encryption key using the at least one namespace encryption key. The object storage service 116 does not need to decrypt and encrypt the blocks, because the blocks remain encrypted using the same key. The change that is occurring is the encryption of the block encryption key by the namespace encryption key rather than a top-level encryption key.

There are several benefits to a namespace having its own encryption key that can be used to encrypt block encryption keys. For example, this is useful for when an object is shared with or copied to a new namespace, as sharing the namespace encryption key provides a more efficient process for both the copy and share commands at the content management system. This is also useful to reduce the number of times the top-level key needs to be looked up from the third-party key management service 260, which is both time and resource intensive.

According to some examples, the method includes encrypting the namespace encryption key with a team key at block 430. For example, the third-party key management service 260 illustrated in FIG. 2 may encrypt the namespace encryption key using the team key. Team keys can be another form of top-level encryption key. Teams can include multiple namespaces under a team, and the team key can be used to encrypt all the namespace encryption keys within the team. This can be useful when the team is an enterprise, or the team can be a family sharing photos all in the same folder. As long as there is at least one namespace, the team key can be used to encrypt the namespace encryption key. Further, the team key can be provided and maintained by a key management service, including third-party key management services, so as to maintain this version of the top-level encryption key outside of the content management system.

Figure 4B:
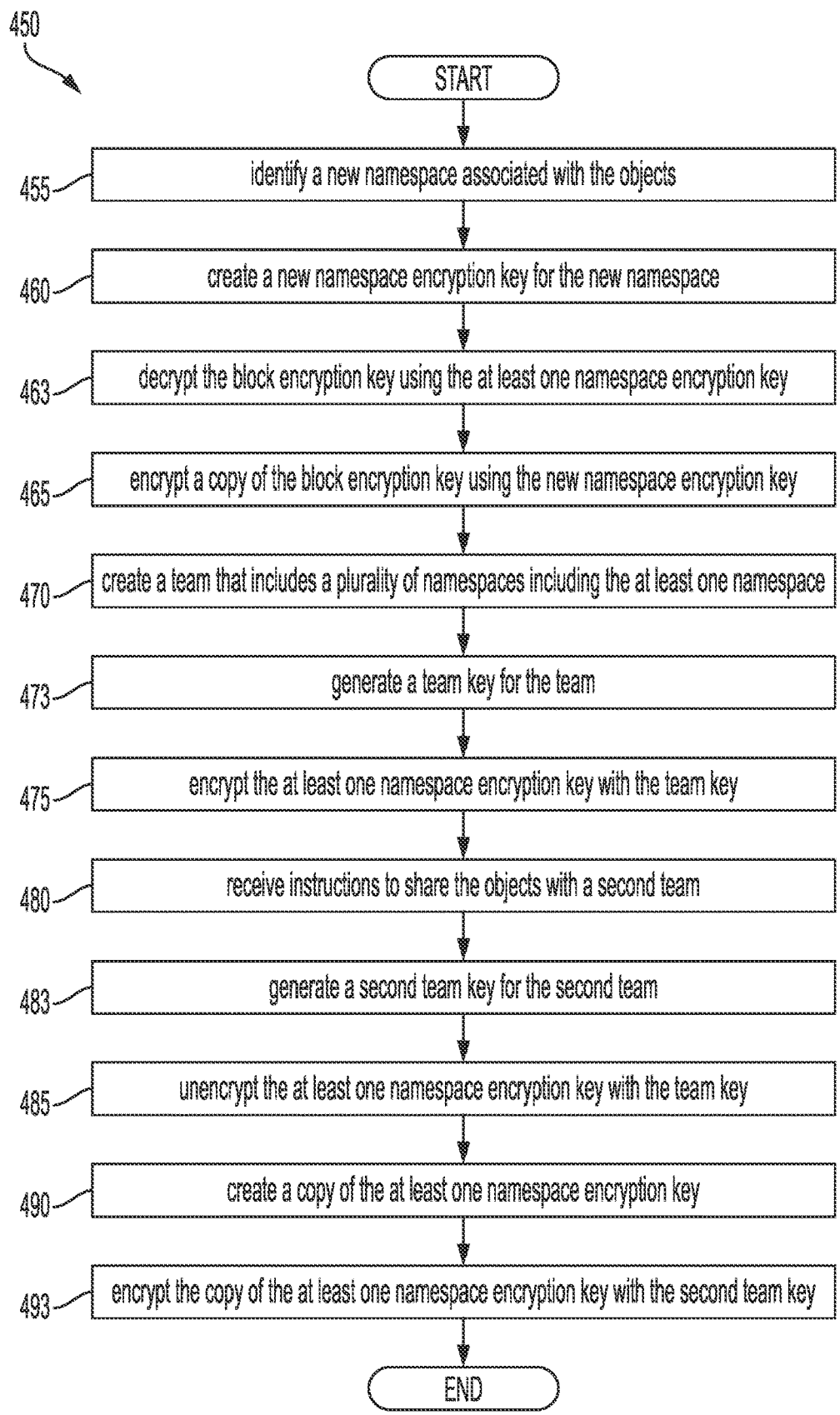
FIG. 4B is a flow chart showing an example method for associating a new namespace and a new team with the objects in accordance with some aspects of the present disclosure.

FIG. 4B illustrates an example method 450 for associating a new namespace and a new team with the objects as described herein. Although the example method 450 depicts a particular sequence of operations, the sequence may be altered without departing from the scope of the present disclosure. For example, some of the operations depicted may be performed in parallel or in a different sequence that does not materially affect the function of the method 450. In other examples, different components of an example device or system that implements the method 450 may perform functions at substantially the same time or in a specific sequence.

According to some examples, the method includes identifying a new namespace associated with the objects at block 455. For example, the object storage service 116 illustrated in FIG. 2 may identify a new namespace associated with the objects. This process can take place after a user shares the object with another user or moves the object, for example. When a new namespace is identified as associated with the object, the system needs to understand how to treat the encryption scheme of the shared object. The first step of implementing the tertiary-level encryption key scheme where a new namespace is associated with the objects is identifying that the object has been associated with additional namespaces.

According to some examples, the method includes creating a new namespace encryption key for the new namespace at block 460. For example, the namespace encryption key database 240 illustrated in FIG. 2 may create a new namespace encryption key for the new namespace. When the system identifies a new namespace associated with the object, if the namespace is still using the global encryption key scheme or the namespace is new, for example, then the system will need to create a namespace encryption key unique to that new namespace. This allows the block encryption keys to be encrypted for the new namespace using the namespace encryption key created for the new namespace.

According to some examples, the method includes decrypting the block encryption key using at least one namespace encryption key at block 463. For example, the object storage service 116 illustrated in FIG. 2 may decrypt the block encryption key using at least one namespace encryption key. Once the block encryption keys are decrypted, the system can provide the copies of the block encryption keys to the new namespace. Using this method, the blocks do not need to be decrypted, because the block encryption keys can be shared or copied instead. This provides a more efficient and streamlined process that is less resource intensive because keys are substantially smaller in size than the encrypted blocks of the object. With less data to encrypt, the process is improved, creating a more secure system that can more easily address a compromised key.

According to some examples, the method includes encrypting a copy of the block encryption key using the new namespace encryption key at block 465. For example, the object storage service 116 illustrated in FIG. 2 may encrypt a copy of the block encryption key using the new namespace encryption key. By encrypting the copies of the block encryption key with the new namespace encryption key, the copies of the block encryption key are now encrypted with a key that is unique to the new namespace, while the underlying data has remained unchanged. This also allows the content management system to have two namespaces pointing to the same data, each with a unique encryption key for the blocks making up the object.

According to some examples, the method includes, at block 470 creating a team that includes multiple namespaces that have permission to access the object, including the namespace identified in block 410. For example, the object storage service 116 illustrated in FIG. 2 may create a team that includes multiple of namespaces.

According to some examples, the method includes generating a team key for the team at block 473. For example, the object storage service 116 identifies the team for the third-party key management service 260 illustrated in FIG. 2 which generates and associates a team key for the team. The team key can be created for namespaces to which the team has access. Team access can include, for example, shared data and enterprise data that the namespaces have permission to access.

According to some examples, the method includes encrypting the namespace encryption keys with the team key at block 475. For example, the object storage service 116 illustrated in FIG. 2 can encrypt the namespace encryption keys to which the team has access with the team key. This third level of encryption provides additional security to the overall system, while allowing the team to protect the underlying data. For example, in an enterprise embodiment, an administrator can control access permissions granted to members of the team. By reducing the access permissions, the third-party key service would no longer decrypt the namespace encryption key for a namespace without proper access permissions. Accordingly, an enterprise administrator has additional tools to limit access to objects protected by a tertiary-level encryption key scheme.

According to some examples, the method includes receiving instructions to share the objects with a second team at block 480. For example, the object storage service 116 illustrated in FIG. 2 may receive instructions to share the objects with a second team, which has access to its own namespaces.

According to some examples, the method includes generating a second team key for the second team at block 483. For example, the object storage service 116 illustrated in FIG. 2 may identify a second team that needs access to objects stored at the content management system 200. The object storage service 116 would then request a second team key generated at the key management service 260 in FIG. 2. This will allow the content management system to utilize the second team key to protect the namespace encryption keys for the second team. The second team is then able to nearly instantly have access to the shared objects based on the tertiary-level encryption key scheme.

According to some examples, the method includes unencrypting the at least one namespace encryption key with the team key at block 485. For example, the object storage service 116 illustrated in FIG. 2 may unencrypt at least one namespace encryption key with the team key. Once the namespace encryption key is in plaintext, it is possible for the content management system to interact with the plaintext namespace encryption key and use it for the purposes of sharing with the second team.

According to some examples, the method includes creating a copy of the at least one namespace encryption key at block 490. For example, the namespace encryption key database 240 illustrated in FIG. 2 may create a copy of the at least one namespace encryption key. This copy of the namespace encryption key can then be sent to the second team, where the second team can then have access to the block encryption key through the namespace encryption key.

According to some examples, the method includes encrypting the copy of the at least one namespace encryption key with the second team key at block 493. For example, the object storage service 116 illustrated in FIG. 2 may encrypt the copy of the at least one namespace encryption key with the second team key. This provides the second team full access to the blocks that comprise the object and the full security and convenience of the tertiary-level encryption key scheme.

Figure 5:
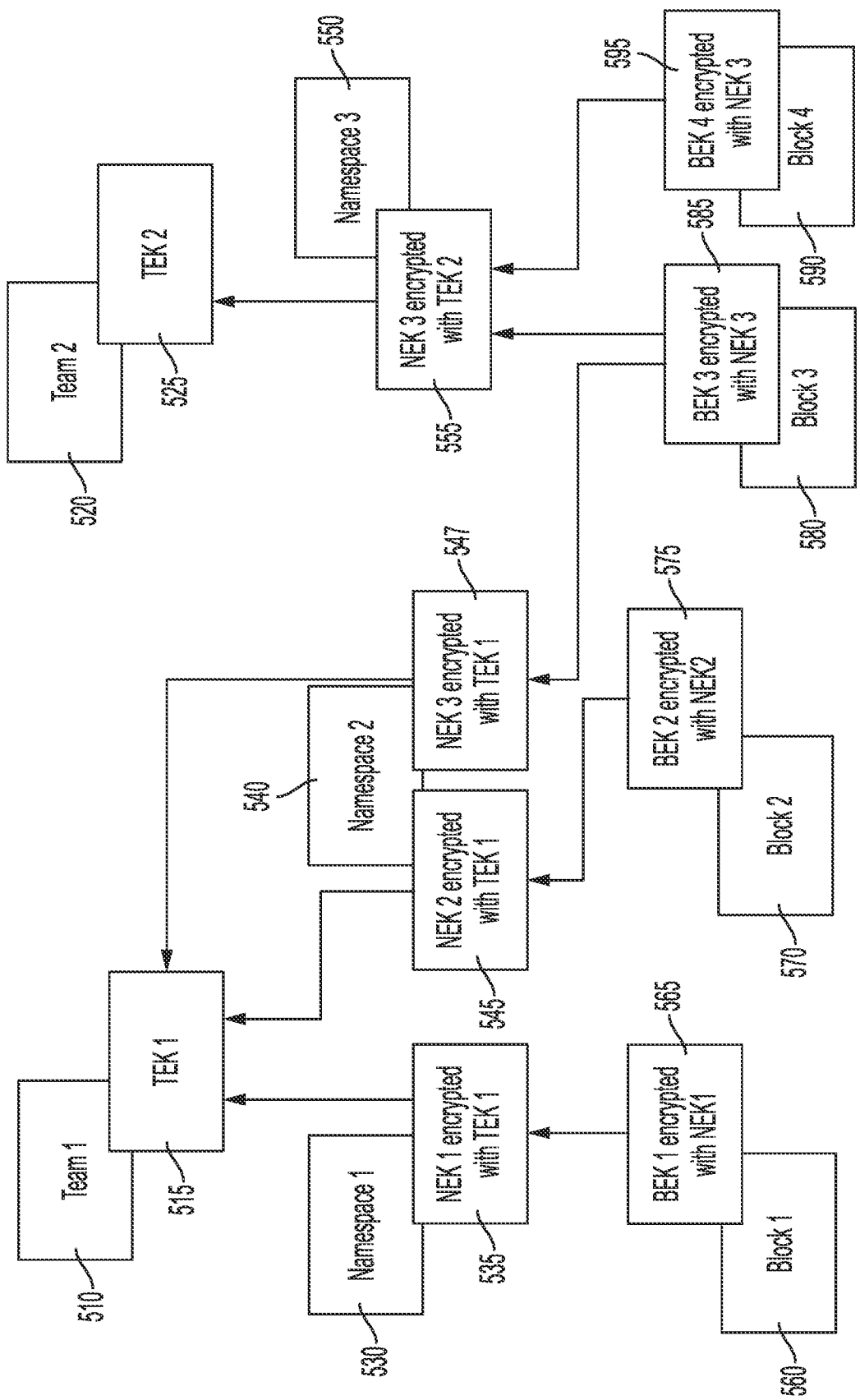
FIG. 5 illustrates an example intermediate configuration for sharing an object between a first time a second team in accordance with some aspects of the present disclosure.

FIG. 5 illustrates an example system that operates according to the method illustrated in FIGS. 4A and 4B and reflects the intermediate state of the system when team two 520 shares block three 580 with team one 510. First, each namespace, namespace one 530, namespace two 540, and namespace three 550 each have their own namespace encryption keys, namespace encryption key one 535, namespace encryption key two 545, and namespace encryption key three 555, respectively. Namespace one 530 and namespace two 540 are each members of team one 510. Therefore, namespace encryption key one 535 and namespace encryption key two 545 are encrypted using team encryption key one 515. Namespace three 550 is a member of team two 520 and namespace encryption key three 555 is therefore encrypted with team encryption key two 525.

Each of the blocks, block one 560, block two 570, block three 580, and block four 590 have their own respective block encryption keys, block encryption key one 565, block encryption key two 575, block encryption key three 585, and block encryption key four 595. In this example, block encryption key one 565 is encrypted with namespace encryption key one 535, block encryption key two 575 is encrypted with namespace encryption key two 545, block encryption key three 585 and block encryption key four 595 are both encrypted with namespace encryption key three 555.

To begin the share process, namespace encryption key three 555 is decrypted and provided to namespace two 540. During this time, block encryption key three 585 is accessible by both namespace two 540 and namespace three 550 because both have access to namespace encryption key three 555. The access is provided to namespace two 540 via a copy of the namespace encryption key three 547 at namespace two 540. The copy of namespace encryption key three 547 is encrypted using team encryption key one 515 to provide block three 580 with three levels of encryption. Namespace encryption key three 555 is still encrypted with team encryption key two 525.

Figure 6:
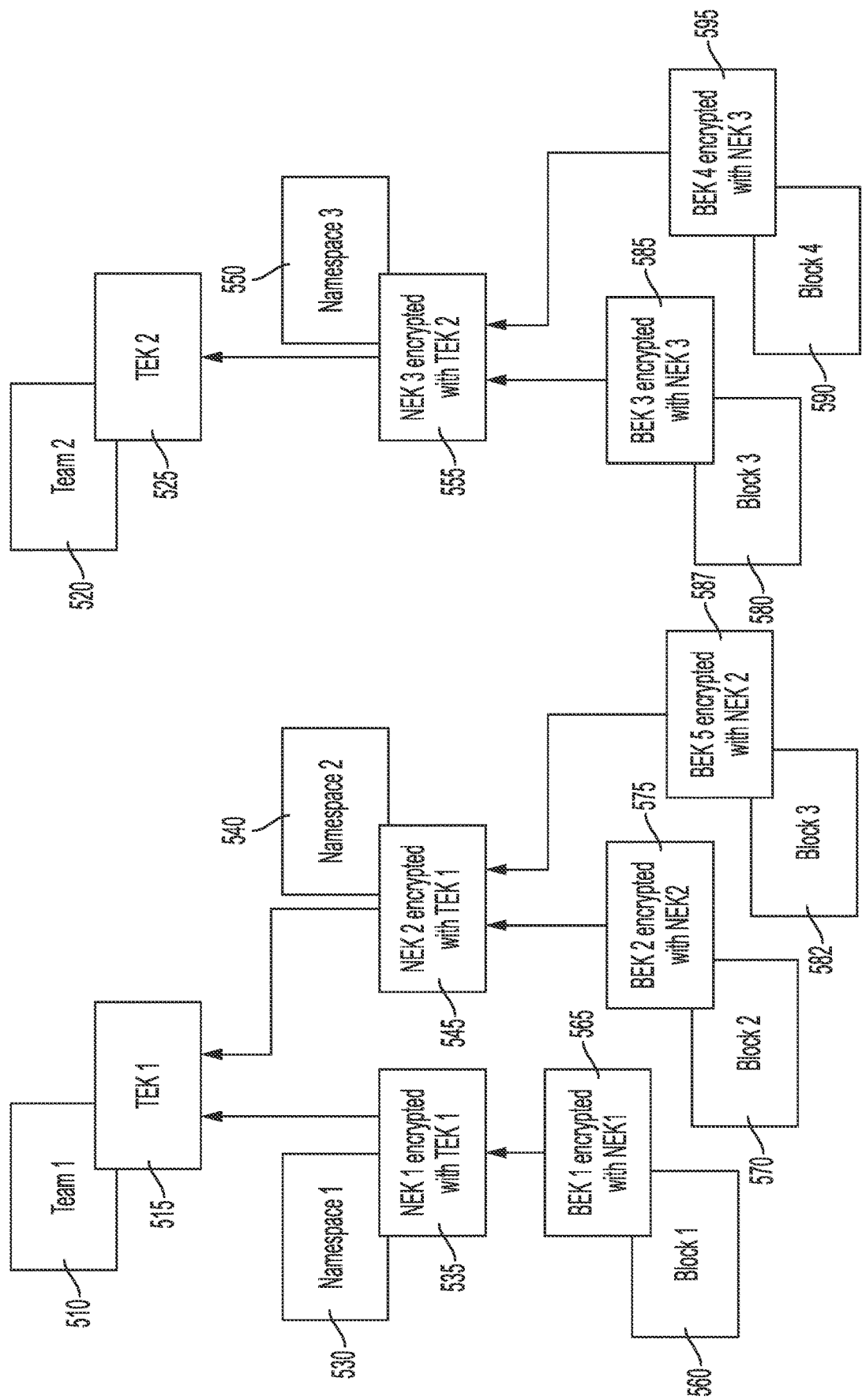
FIG. 6 illustrates an example steady-state configuration for sharing an object between a first time and a second team in accordance with some aspects of the present disclosure.

Once the system has reached this intermediate state exemplified by FIG. 5, the system can start the process of creating a final, steady state for the system where namespace two 540 has access to its own copy of block three with new tertiary-level encryption key scheme. This steady state is shown in FIG. 6, which keeps the same numbering scheme from FIG. 5 when the blocks represent the same module. The steady state of FIG. 6 shows that the system has moved a copy of block three 582 to namespace two 540. The copy of block three 582, then has its own block encryption key five 587 that is used to encrypt the copy of block three 582. Block encryption key five 587 is then encrypted using namespace encryption key two 545 as part of the tertiary-level encryption key scheme. Accordingly, a member of team two 520 has shared block three 580 with a member of team one 510.

Figure 7:
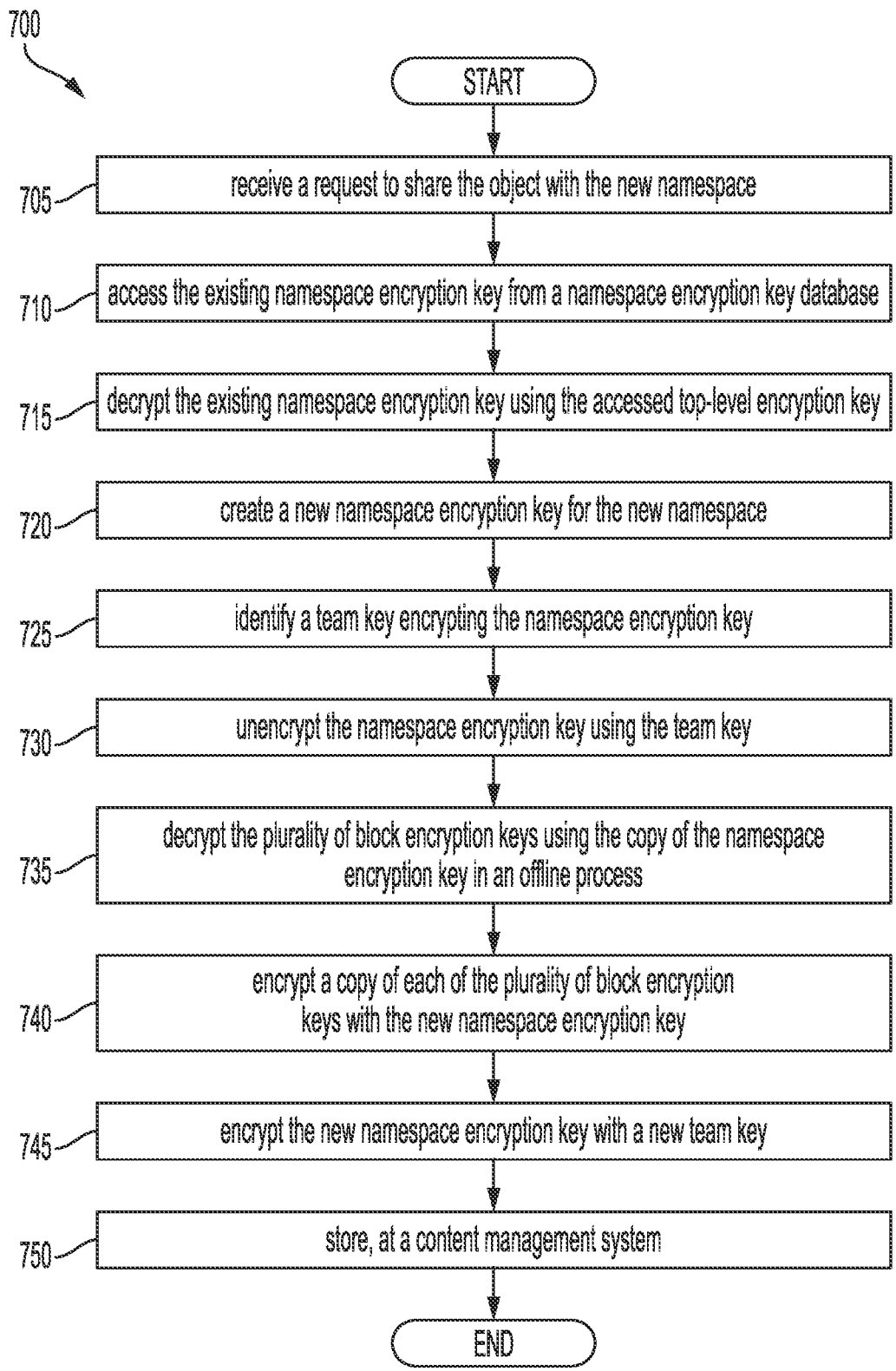
FIG. 7 is a flow chart showing an example method for sharing an object between a first and second namespace in accordance with some aspects of the present disclosure.

FIG. 7 illustrates an example method 700 for copying or sharing objects between namespaces substantially instantaneously. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

One consequence of encrypting blocks making up objects where the decryption keys are specific to a team is that sharing or moving objects with people or locations outside of the team is often slow. This is because the system can't share the top-level key that is needed to decrypt the block-level decryption key without making all of the data under the top-level key vulnerable. The system must decrypt the blocks before they are shared. If a large object or a large number of objects are transferred this process can cause considerable delay.

The present technology avoids both of the above problems by introducing the middle-level key—the namespace encryption key. In the tertiary-level encryption key scheme addressed herein, the system can share the namespace encryption key with a user(s) receiving the objects. While some objects that are not being shared might also be encrypted by the namespace encryption key, this is often a small number of objects compared to the number of objects protected by the top-level (team key).

The sharing or moving of an object that includes sharing the namespace encryption key results in substantially instantaneous sharing of the object. By substantially instantaneous it is meant that the users do not perceive any delay. A sharing user shares the object and the receiving user can access the object as soon as they receive the notification, which is nearly immediate. On a more technical level, substantially instantaneous means that the objects are shared without first being decrypted. The receiving user receives access to the encrypted blocks and also receives the namespace encryption key needed to decrypt the block keys at the time the receiving user desires to access the object. There is no delay due to any encryption/decryption operations and the blocks do not need to be copied from on location to another in the content management system. Rather the content management system records updated access permissions to the shared objects and notifies the recipients that they can access the shared objects.

After the sharing, as addressed herein, an asynchronous process can cycle namespace encryption keys and block keys so that the shared namespace encryption key is no longer valid to decrypt objects that might not have been shared.

According to some examples, the method includes receiving a request to share the object with the new namespace at block 705. For example, the object storage service 116 illustrated in FIG. 2 may receive a request to share the object with the new namespace. The object is made up of at least one block. The block(s) is encrypted with a block encryption key that is unique to each specific block. The block encryption key for each block is encrypted using the existing namespace encryption key.

According to some examples, the method includes accessing the existing namespace encryption key from a namespace encryption key database at block 710. For example, the object storage service 116 illustrated in FIG. 2 may access the existing namespace encryption key from a namespace encryption key database 240. The namespace encryption key is encrypted with the top-level encryption key. The top-level encryption key can be local to the content management system or provided by a third-party key management service 260.

According to some examples, the method includes decrypting the existing namespace encryption key using the accessed top-level encryption key at block 715. For example, the object storage service 116 illustrated in FIG. 2 may decrypt the existing namespace encryption key using the accessed top-level encryption key or it may receive the decrypted namespace encryption key from a third-party key management service. The user account accessing the object from the new namespace can decrypt the block encryption keys using the provided existing namespace encryption key substantially immediately upon the association of the object with the new namespace because the new namespace has access to the existing namespace encryption key. Furthermore, this access is made possible by using the existing namespace encryption key, so the access takes place without needing to first decrypt the blocks. The copy of the namespace encryption key provides the new namespace access to the plurality of block encryption keys, which stay the same and provide access to the underlying blocks.

According to some examples, the method includes creating a new namespace encryption key for the new namespace at block 720. For example, the namespace encryption key database 240 illustrated in FIG. 2 may create a new namespace encryption key for the new namespace. This new namespace encryption key can then be used by the system to encrypt each of the block level encryption keys for each block, without having to encrypt the blocks of data themselves.

According to some examples, the method includes identifying a team key encrypting the namespace encryption key at block 725. For example, the object storage service 116 illustrated in FIG. 2 may identify a team key encrypting the namespace encryption key. The object storage service 116 is then able to begin the process of decrypting the namespace encryption key which may include requesting that the third-party key management service 260 decrypt the namespace encryption key. The third-party key management service 260 would then return the namespace encryption key as plaintext. Once the content management system receives the plaintext namespace encryption key, the system can then use the plaintext namespace encryption key to begin the process of decrypting the block encryption keys.

According to some examples, the method includes unencrypting the namespace encryption key using the team key at block 730. For example, the object storage service 116 illustrated in FIG. 2 may unencrypt the namespace encryption key using the team key. Alternatively, the third-party key management service 260 can decrypt the namespace encryption key and send the plaintext namespace encryption key back to the object storage service 116. The system is then able to copy the plaintext namespace encryption key and provide it to the new namespace, where the new namespace can use the copy of the existing namespace encryption key to decrypt the block encryption keys of the object that is shared.

According to some examples, the method includes decrypting the plurality of block encryption keys using the copy of the namespace encryption key at block 735. This decryption process can take place offline. For example, the object storage service 116 illustrated in FIG. 2 may decrypt the plurality of block encryption keys using the copy of the namespace encryption key. This allows the system to access the plaintext block encryption keys. The plaintext block encryption keys can be either copied so that the new namespace has access to the appropriate block encryption keys for an object or use the plaintext encryption keys to decrypt the appropriate blocks for the requested object.

According to some examples, the method includes encrypting a copy of each of the plurality of block encryption keys with the new namespace encryption key at block 740. For example, the object storage service 116 illustrated in FIG. 2 may encrypt or wrap a copy of each of the plurality of block encryption keys with the new namespace encryption key. This process provides a copy of each block encryption key to the new namespace, and makes the requested object available for the new namespace.

According to some examples, the method includes encrypting or wrapping the new namespace encryption key with a new team key at block 745. For example, the object storage service 116 illustrated in FIG. 2 may encrypt or wrap the new namespace encryption key with a new team key. Alternatively, the object storage service 116 can send the namespace encryption key to the third-party key management service 260, so that the third-party key management service 260 can encrypt the namespace encryption key with a top-level or team key. This provides the tertiary-level encryption key scheme for the blocks of an object, after the blocks have been shared with a new namespace.

According to some examples, the method includes storing, at a content management system, the new namespace encryption key at block 750. For example, the namespace encryption key database 240 illustrated in FIG. 2 may store the namespace encryption key and the new namespace encryption key. This allows the system to access the namespace encryption keys when objects stored in association with the respective namespaces are requested. Furthermore, the block encryption keys and the plurality of blocks can be stored together at the storage device 250. This system and process allows the namespace encryption keys to be used to decrypt the block encryption keys, which can be used to decrypt the blocks themselves.

Figure 8:
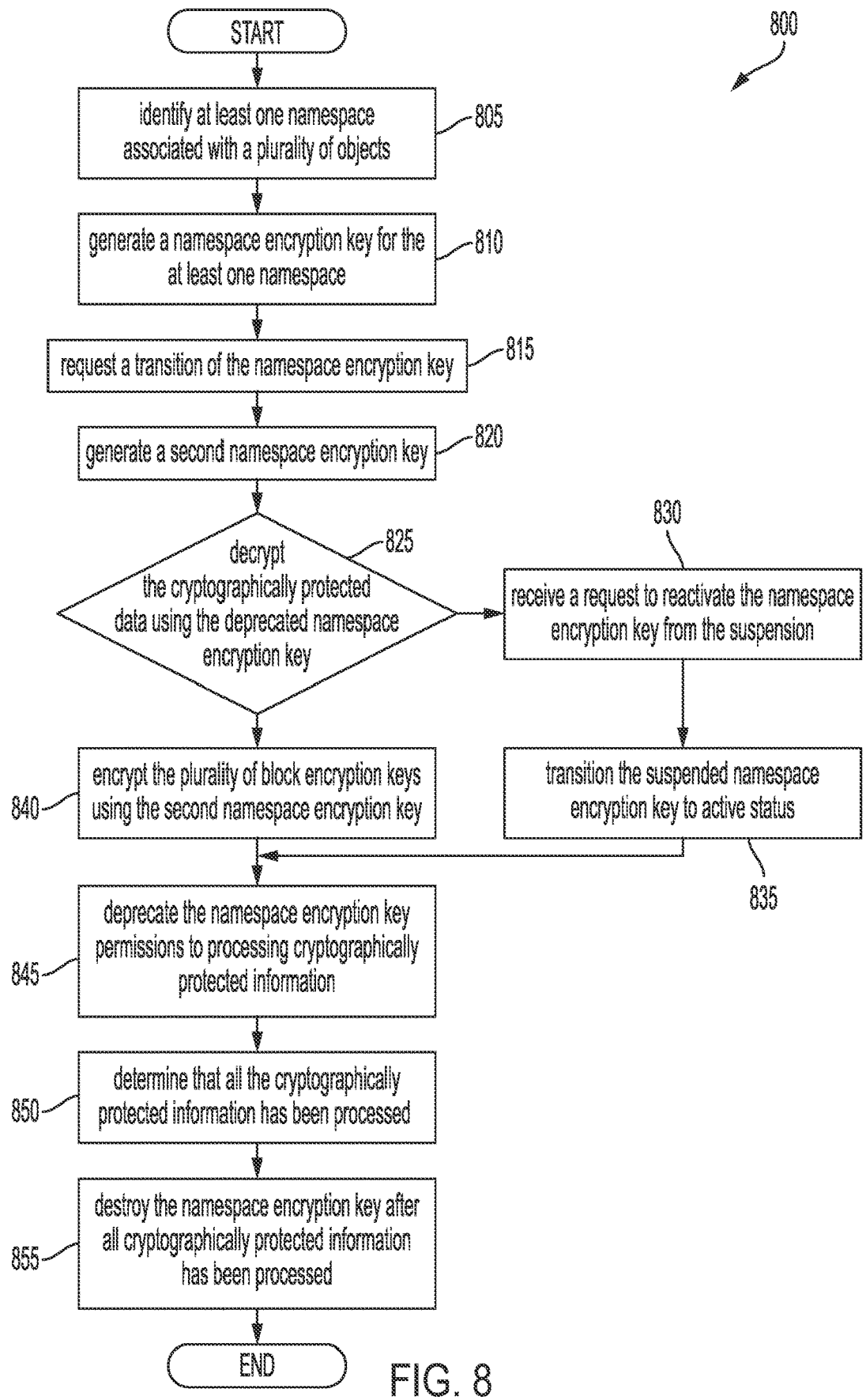
FIG. 8 is a flow chart showing an example method for rotating keys within a key management system in accordance with some aspects of the present disclosure.

FIG. 8 illustrates an example method 800 for rotating keys within a key management system. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 600 may perform functions at substantially the same time or in a specific sequence.

According to some examples, the method includes identifying at least one namespace associated with a plurality of objects at block 805. For example, the object storage service 116 illustrated in FIG. 2 may identify at least one namespace associated with a plurality of objects.

According to some examples, the method includes generating a namespace encryption key for the at least one namespace at block 810. For example, the object storage service 116 illustrated in FIG. 2 may identify the need for a namespace encryption key and request the namespace encryption key from the third-party key management service 260. The namespace encryption key generated by the third-party key management service 260 is then received by the content management system 110 and stored in the namespace encryption key database 240 illustrated in FIG. 2.

According to some examples, the method includes requesting a transition of the namespace encryption key at block 815. For example, the object storage service 116 illustrated in FIG. 2 may request a transition of the namespace encryption key. The requested transition of the namespace encryption key can be based on the namespace encryption key being compromised or because a predetermined period of time after the generation of the namespace encryption key has passed. Furthermore, the transition of the namespace encryption key to a new namespace encryption key can be based on a request received at a content management system, for example, a user or system administrator may request that the keys be transitioned to new keys.

According to some examples, the method includes generating a second namespace encryption key at block 820. For example, the content management system 110 can request a new namespace encryption key from the third-party key management service 260 illustrated in FIG. 2 which can generate a second namespace encryption key. The second namespace encryption key can be stored by the namespace encryption key database 240 illustrated in FIG. 2.

According to some examples, the method includes decrypting the cryptographically protected data using the deprecated namespace encryption key at block 825. For example, the object storage service 116 illustrated in FIG. 2 may decrypt the cryptographically protected data using the deprecated namespace encryption key. This would leave the block encryption key as plain text.

According to some examples, the method includes encrypting the plurality of block encryption keys using the second namespace encryption key at block 840. For example, the storage system illustrated in FIG. 2 may encrypt the plurality of block encryption keys using the second namespace encryption key. This process has provided a transition from a first namespace encryption key to a second namespace encryption key.

According to some examples, the system can suspend a namespace encryption key from use by the system, for example, suspension can take place in the event of a user request or if the key is identified as potentially compromised. After the system suspends the namespace encryption key, the system can encounter situations where the suspension needs to be reversed, and the namespace encryption key reactivated. For example, when a user, e.g., end user or administrator, requests the suspension of a namespace encryption key for a period of time, after that time period, the user may request reactivation. Another example includes that the fear of a compromised namespace encryption key was unfounded, and the key is actually safe for the system to continue using. In these situations, a process is needed to reactivate a suspended namespace encryption key. According to some examples, the method includes receiving a request to reactivate the namespace encryption key from a suspension at block 830. For example, the object storage service 116 illustrated in FIG. 2 may receive a request to reactivate the namespace encryption key from the suspension.

According to some examples, the method includes transitioning the suspended or deprecated namespace encryption key to active status at block 835. For example, the object storage service 116 illustrated in FIG. 2 may request and transition the deprecated namespace encryption key to active status, thereby restoring access to the namespace encryption key.

According to some examples, the method includes deprecating the namespace encryption key permissions to process cryptographically protected information at block 845. For example, the object storage service 116 illustrated in FIG. 2 may deprecate the namespace encryption key permissions so as to limit the permissions to processing cryptographically protected information. When the system limits the permissions, the system reduces the permissions available to the namespace encryption key, but still allows the system to access the underlying block encryption keys. Limited permissions can be useful when transitioning from a compromised key to a new non-compromised key, as the compromised key is not able to impact the underlying data or encrypt any new data.

According to some examples, the method includes determining that all the cryptographically protected information has been processed at block 850. For example, the object storage service 116 illustrated in FIG. 2 may determine that all the cryptographically protected information has been processed and the original namespace encryption key is not being used to encrypt any more data. This cryptographically protected data includes a plurality of block encryption keys. Once the data associated with the original namespace encryption key has been processed, the system can remove or delete the namespace encryption key and rely solely on the new namespace encryption key that now is used to encrypt and decrypt the protected data.

According to some examples, the method includes destroying the namespace encryption key after all cryptographically protected information has been processed at block 855. For example, the namespace encryption key database 240 illustrated in FIG. 2 can destroy the namespace encryption key after all cryptographically protected information has been processed. The destroyed namespace encryption key can be made unrecoverable.

Figure 9:
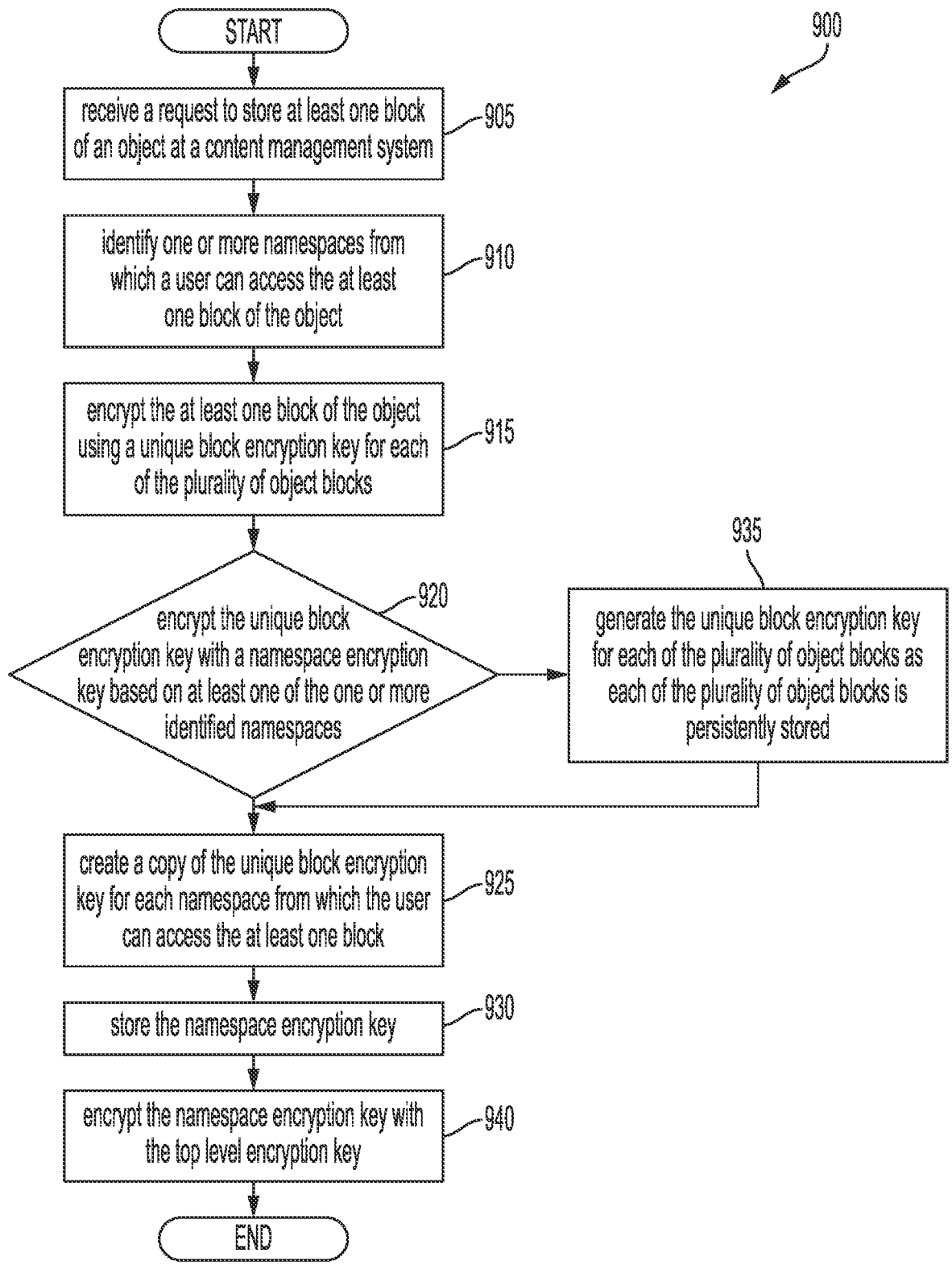
FIG. 9 is a flow chart showing an example method for encrypting an object encrypted by a tertiary-level encryption key scheme in accordance with some aspects of the present disclosure.

FIG. 9 illustrates an example method 900 for protecting an encryption key using a tertiary-level encryption key scheme. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes receiving a request to store at least one block of an object at a content management system at block 905. For example, the object storage service 116 illustrated in FIG. 2 may receive a request to store at least one block of an object at a content management system. Each object can be broken into blocks of no greater than 4 MBs.

According to some examples, the method includes identifying one or more namespaces from which a user can access the at least one block of the object at block 910. For example, the object storage service 116 illustrated in FIG. 2 may identify one or more namespaces from which a user can access the at least one block of the object.

According to some examples, the method includes encrypting the at least one block of the object using a unique block encryption key for each of the plurality of object blocks at block 915. For example, the object storage service 116 illustrated in FIG. 2 may encrypt the at least one block of the object using a unique block encryption key for each of the plurality of object blocks.

According to some examples, the method includes encrypting the unique block encryption key with a namespace encryption key based on at least one of the one or more identified namespaces at block 920. For example, the object storage service 116 illustrated in FIG. 2 may encrypt the unique block encryption key with a namespace encryption key based on at least one of the one or more identified namespaces. The namespace encryption key is protected by a top-level encryption key.

According to some examples, the method includes creating a copy of the unique block encryption key for each namespace from which the user can access the at least one block at block 925. For example, the namespace encryption key database 240 illustrated in FIG. 2 may create a copy of the unique block encryption key for each namespace from which the user can access the at least one block. The copies of the unique block encryption are encrypted with respective namespace encryption keys so that each namespace has access to the objects stored in a user account associated with each namespace.

According to some examples, the method includes generating the unique block encryption key for each of the plurality of object blocks as each of the plurality of object blocks is persistently stored at block 935. For example, the object storage service 116 illustrated in FIG. 2 may generate the unique block encryption key for each of the plurality of object blocks as each of the plurality of object blocks is persistently stored.

According to some examples, the method includes storing the namespace encryption key at block 930. For example, the namespace encryption key database 240 illustrated in FIG. 2 may store the namespace encryption key. The namespace encryption key can be initially generated at the creation of the namespace. The namespace encryption key is typically generated by the third-party key management service 260 on request from the content management system 110 when a new namespace is created.

According to some examples, the method includes encrypting the namespace encryption key with the top-level encryption key at block 940. For example, the object storage service 116 or the third-party key management service 260 illustrated in FIG. 2 may encrypt the namespace encryption key with the top-level encryption key. The key management service can be provided by a party other than the content management system. The key management service can also utilize a hardware security module to generate the top-level keys.

Figure 10:
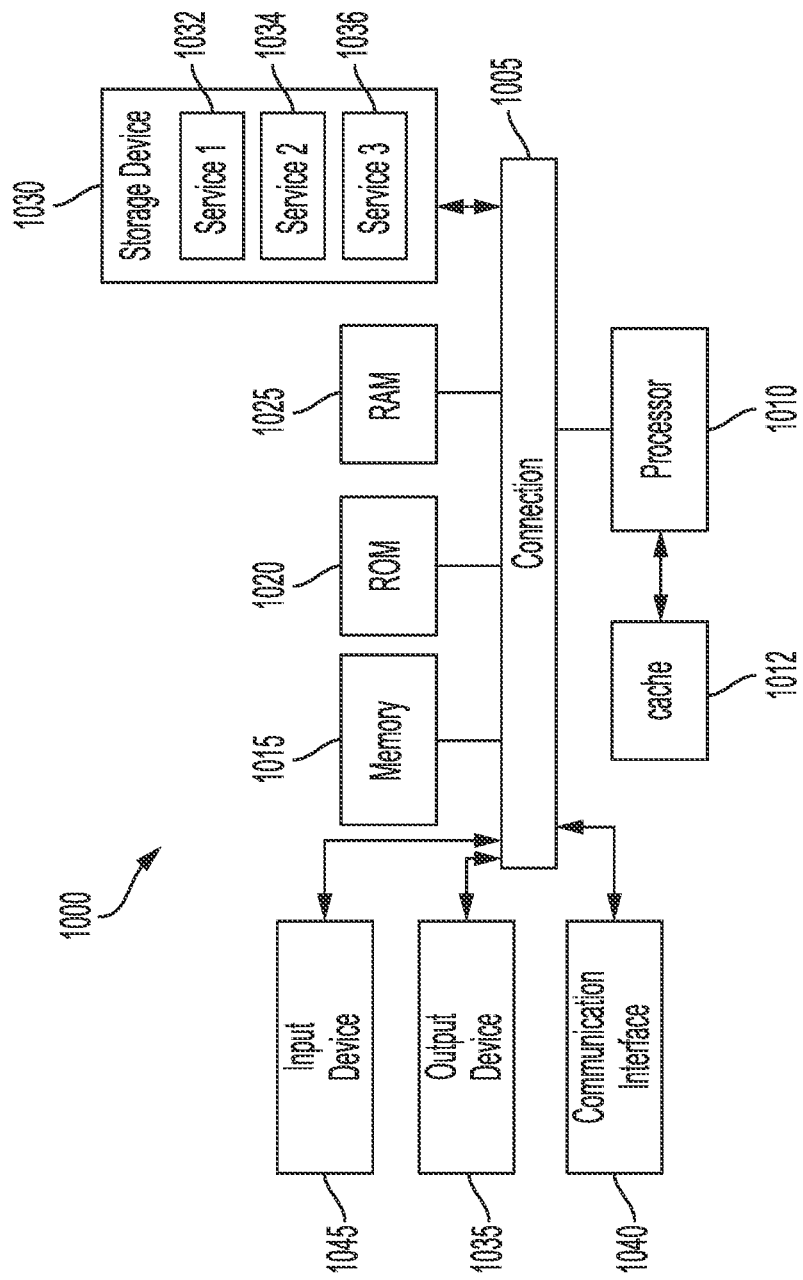
FIG. 10 shows an example of a system for implementing certain aspects of the present technology.

FIG. 10 shows an example of computing system 1000, which can be for example any computing device making up the content management system or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement, and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative Examples of the Disclosure Include:

Aspect 1. A method for accessing at least a portion of an object that is encrypted by at least one block encryption key, wherein the at least one block encryption key is nested within at least a tertiary-level encryption key scheme, the method comprising: receiving a request to access blocks making up an object by a service of a content management system; determining whether the user account requesting the blocks making up the object is in possession of a namespace encryption key; when it is determined that the user account requesting the blocks is not in possession of the namespace encryption key: accessing a top-level encryption key from a key management service; accessing the namespace encryption key from a namespace encryption key database, wherein the namespace encryption key is encrypted with the top-level encryption key; decrypting the namespace encryption key using the accessed top-level encryption key; when the user account requesting the blocks making up the object is in possession of the namespace encryption key: accessing the blocks making up the object and respective block encryption keys protecting the blocks from a storage system at the content management system, wherein the block encryption keys are encrypted with the namespace encryption key; decrypting the respective block encryption keys using the namespace encryption key; and decrypting the blocks using the respective block encryption keys.

Aspect 2. The method of Aspect 1, wherein the object is made up of at least two blocks of no greater than 4 MB in size.

Aspect 3. The method of any of Aspects 1 to 2, wherein each block of the at least two blocks making up the object is encrypted with a block encryption key that is unique to each block.

Aspect 4. The method of any of Aspects 1 to 3, wherein the new team key is different from a team key wrapping the namespace encryption key.

Aspect 5. A method for protecting an encryption key used to encrypt at least one block of an object with at least a tertiary-level encryption key scheme, the method comprising: receiving a request to store at least one block of an object at a content management system, wherein each object is broken into blocks of no greater than 4 MBs; identifying one or more namespaces from which a user can access the at least one block of the object; encrypting the at least one block of the object using a unique block encryption key for each of the plurality of object blocks; and encrypting the unique block encryption key with a namespace encryption key based on at least one of the one or more identified namespaces, wherein the namespace encryption key is protected by a top-level encryption key.

Aspect 6. The method of Aspect 5, wherein the encrypting the unique block encryption key with the namespace encryption further comprises: creating a copy of the unique block encryption key for each namespace from which the user can access the at least one block, the copies unique block encryption being encrypted with respective namespace encryption keys.

Aspect 7. The method of any of Aspects 5 to 6, further comprising: persistently storing the at least one block at a content management system after encrypting the at least one blocks.

Aspect 8. The method of any of Aspects 5 to 7, wherein the object is made up of a plurality of object blocks, the method further comprising: generating the unique block encryption key for each of the plurality of object blocks as each of the plurality of object blocks is persistently stored.

Aspect 9. The method of any of Aspects 5 to 8, further comprising: storing the namespace encryption key; and encrypting the namespace encryption key with the top level encryption key.

Aspect 10. The method of any of Aspects 5 to 9, wherein the top level encryption key is generated by a key management service, wherein the key management service is provided by a party other than the content management system, wherein the key management service utilizes a hardware security module to generate keys.

Aspect 11. The method of any of Aspects 5 to 10, further comprising: receiving a request to share the plurality of objects with a new namespace, wherein the new namespace has a different namespace encryption key and the different namespace encryption key is wrapped using the top level encryption key; and providing, by the content management system, the encryption key to the new namespace.

Aspect 12. The method of any of Aspects 5 to 11, wherein the namespace encryption key is initially generated at the creation of the namespace.

Aspect 13. A method for transitioning from a global key to a namespace encryption key, the method comprising: storing objects encrypted using a block encryption key, wherein the block encryption key is encrypted with a global key; identifying at least one namespace associated with the objects; creating a namespace encryption key for the at least one namespace; decrypting the block encryption key using the global key; encrypting the block encryption key using the at least one namespace encryption key; storing the at least one namespace encryption key.

Aspect 14. The method of Aspect 13, further comprising: identifying a new namespace associated with the objects; creating a new namespace encryption key for the new namespace; decrypting the block encryption key using the at least one namespace encryption key; and encrypting a copy of the block encryption key using the new namespace encryption key.

Aspect 15. The method of any of Aspects 13 to 14, further comprising: encrypting the block encryption key using the at least one namespace encryption key.

Aspect 16. The method of any of Aspects 13 to 15, further comprising: creating a team that includes a plurality of namespaces including the at least one namespace; generating a team key for the team; and encrypting the at least one namespace encryption key with the team key.

Aspect 17. The method of any of Aspects 13 to 16, further comprising: receiving instructions to share the objects with a second team; generating a second team key for the second team; unencrypting the at least one namespace encryption key with the team key; creating a copy of the at least one namespace encryption key; and encrypting the copy of the at least one namespace encryption key with the second team key.

Aspect 18. The method of any of Aspects 13 to 17, further comprising: storing the team key in cache at the content management system.

Aspect 19. The method of any of Aspects 13 to 18, further comprising: prior to creating the namespace encryption key, confirming a token is available that provides access permissions for the at least one namespace associated with the objects.

Aspect 20. A method of instantaneous sharing of an object to a new namespace when the object is encrypted by an existing namespace encryption key associated with the current namespace through which the object is currently accessible, the method comprising: receiving a request to share the object with the new namespace; accessing the existing namespace encryption key from a namespace encryption key database, wherein the namespace encryption key is encrypted with the top-level encryption key; receiving a decrypted namespace encryption key using the accessed top-level encryption key; without first decrypting the object, wherein the object is made up of at least one block, the at least one block being encrypted with a block encryption key, and the block encryption key being encrypted by the existing namespace encryption key; whereby a user accessing the object from the new namespace can decrypt the block encryption keys using the provided existing namespace encryption key substantially immediately upon the association of the object with the new namespace.

Aspect 21. The method of Aspect 20, further comprising: creating a new namespace encryption key for the new namespace; decrypting the plurality of block encryption keys using the copy of the namespace encryption key in an offline process; and wrapping a copy of each of the plurality of block encryption keys with the new namespace encryption key.

Aspect 22. The method of any of Aspects 20 to 21, further comprising: encrypting the new namespace encryption key with a new team key.

Aspect 23. The method of any of Aspects 20 to 22, further comprising: storing, at a content management system, the encrypted plurality of block encryption keys with the plurality of blocks.

Aspect 24. The method of any of Aspects 20 to 23, further comprising: prior to decrypting the plurality of block encryption keys, identifying a team key wrapping the namespace encryption key; and unencrypting the namespace encryption key using the team key.

Aspect 25. The method of any of Aspects 20 to 24, wherein the copy of the namespace encryption key provides the new namespace access to the plurality of block encryption keys.

Aspect 26. A method comprising: identifying at least one namespace associated with a plurality of objects; generating a namespace encryption key for the at least one namespace; requesting a transition of the namespace encryption key; deprecating the namespace encryption key permissions to processing cryptographically protected information; and determining that all the cryptographically protected information has been processed.

Aspect 27. The method of Aspect 26, wherein the cryptographically protected information includes a plurality of block encryption keys.

Aspect 28. The method of any of Aspects 26 to 27, further comprising: after requesting the transition of the namespace encryption key, generating a second namespace encryption key; decrypting the cryptographically protected data using the deprecated namespace encryption key; and encrypting the plurality of block encryption keys using the second namespace encryption key.

Aspect 29. The method of any of Aspects 26 to 28, wherein the requested transition of the namespace encryption key is based on the namespace encryption key being compromised.

Aspect 30. The method of any of Aspects 26 to 29, wherein the requested transition of the namespace encryption key is based on a predetermined period of time after generation of the namespace encryption key.

Aspect 31. The method of any of Aspects 26 to 30, wherein the requested transition of the namespace encryption key is based on a based on a request received at a content management system.

Aspect 32. The method of any of Aspects 26 to 31, further comprising: destroying the namespace encryption key after all cryptographically protected information has been processed, wherein the destroyed namespace encryption key is unrecoverable.

Aspect 33. The method of any of Aspects 26 to 32, wherein the requested transition is a suspension of permissions to the cryptographically protected information.

Aspect 34. The method of any of Aspects 26 to 33, further comprising: receiving a request to reactivate the namespace encryption key from the suspension; and transitioning the deprecated namespace encryption key to active status, including full permissions to encrypt and decrypt data.

What is claimed is:

1. A method comprising:
receiving a request to access a plurality of blocks making up an object by a service of a content management system;
determining whether a user account requesting the plurality of blocks making up the object possesses a namespace encryption key, wherein an encrypted version of the namespace encryption key is stored at the content management system, the encrypted version of the namespace encryption key is encrypted using a top-level encryption key;
sending the encrypted version of the namespace encryption key to a key management service;
in response to sending the encrypted version of the namespace encryption key, receiving, by the service associated with the content management system, a decrypted version of the namespace encryption key from the key management service;
storing the decrypted version of the namespace encryption key in a namespace encryption key database at the content management system;
requesting, by the service associated with the content management system, the decrypted version of the namespace encryption key from the namespace encryption key database;
receiving, by the service associated with the content management system, the decrypted version of the namespace encryption key from the namespace encryption key database;
when the user account requesting the plurality of blocks making up the object also possesses access permissions for the object associated with the namespace encryption key, accessing the plurality of blocks making up the object from a storage system at the content management system and respective block encryption keys encrypting the plurality of blocks, wherein the respective block encryption keys are encrypted using the namespace encryption key;
decrypting the respective block encryption keys using the decrypted version of the namespace encryption key; and
decrypting the plurality of blocks using the respective block encryption keys.

2. The method of claim 1, wherein the plurality of blocks is made up of at least two blocks of no greater than 4 MB in size and each block of the at least two blocks making up the object is encrypted with a block encryption key that is unique to each block.

3. The method of claim 1, wherein the top-level encryption key is stored external to the content management system.

4. The method of claim 1, wherein the key management service utilizes a hardware security module to generate keys.

5. The method of claim 1, further comprising:
receiving a request to share a content item with a new namespace;
creating a copy of the namespace encryption key; and
providing the copy of the namespace encryption key to the new namespace.

6. The method of claim 5, further comprising:
creating a new namespace encryption key for the new namespace;
decrypting the respective block encryption keys using the copy of the namespace encryption key; and encrypting a copy of each of the respective block encryption keys with the new namespace encryption key.

7. A content management system comprising:
one or more processors; and
a non-transitory computer-readable medium storing instructions that, when executed by the one or more processors, cause the one or more processors to:
receive a request to access a plurality of blocks making up an object by a service of a content management system;
determine whether a user account requesting the plurality of blocks making up the object possesses a namespace encryption key, wherein an encrypted version of namespace encryption key is stored at the content management system, the encrypted version of the namespace encryption key is encrypted using a top-level encryption key;
send the encrypted version of the namespace encryption key to a key management service;
in response to sending the encrypted version of the namespace encryption key, receive, by the service associated with the content management system, a decrypted version of the namespace encryption key from the key management service;
store the decrypted version of the namespace encryption key in a namespace encryption key database at the content management system;
request, by the service associated with the content management system, the decrypted version of the namespace encryption key from the namespace encryption key database;
receive, by the service associated with the content management system, the decrypted version of the namespace encryption key from the namespace encryption key database;
when the user account requesting the plurality of blocks making up the object also possesses access permissions for the object associated with the namespace encryption key, access the plurality of blocks making up the object from a storage system at the content management system and respective block encryption keys encrypting the plurality of blocks, wherein the respective block encryption keys are encrypted using the namespace encryption key;
decrypt the respective block encryption keys using the decrypted version of the namespace encryption key; and
decrypt the plurality of blocks using the respective block encryption keys.

8. The content management system of claim 7, wherein the plurality of blocks is made up of at least two blocks of no greater than 4 MB in size and each block of the at least two blocks making up the object is encrypted with a block encryption key that is unique to each block.

9. The content management system of claim 7, wherein the top-level encryption key is stored external to the content management system.

10. The content management system of claim 7, wherein the key management service utilizes a hardware security module to generate keys.

11. A non-transitory computer-readable medium storing instructions that, when executed by one or more processors, cause the one or more processors to:
receive a request to access a plurality of blocks making up an object by a service of a content management system;
determine whether a user account requesting the plurality of blocks making up the object possesses a namespace encryption key, wherein an encrypted version of namespace encryption key is stored at the content management system, the encrypted version of the names pace encryption key is encrypted using a top-level encryption key;
send the encrypted version of the namespace encryption key to a key management service;
in response to sending the encrypted version of the namespace encryption key, receive, by the service associated with the content management system, a decrypted version of the namespace encryption key from the key management service;
store the decrypted version of the namespace encryption key in a namespace encryption key database at the content management system;
request, by the service associated with the content management system, the decrypted version of the namespace encryption key from the namespace encryption key database;
receive, by the service associated with the content management system, the decrypted version of the namespace encryption key from the namespace encryption key database;
when the user account requesting the plurality of blocks making up the object is in possession of the namespace encryption key, access the plurality of blocks making up the object from a storage system at the content management system and respective block encryption keys encrypting the plurality of blocks, wherein the respective block encryption keys are encrypted using the namespace encryption key;
decrypt the respective block encryption keys using the namespace encryption key; and
decrypt the plurality of blocks using the respective block encryption keys.

12. The non-transitory computer-readable medium of claim 11, wherein the plurality of blocks is made up of at least two blocks of no greater than 4 MB in size and each block of the at least two blocks making up the object is encrypted with a block encryption key that is unique to each block.

13. The non-transitory computer-readable medium of claim 11, wherein the top-level encryption key is stored external to the content management system.

14. The non-transitory computer-readable medium of claim 11, wherein the key management service utilizes a hardware security module to generate keys.

* * * * *